Patented June 10, 1941

2,245,203

UNITED STATES PATENT OFFICE 2,245,203

MANUFACTURE OF MOLDED COMPOSITIONS FOR BRAKE LININGS OR SIMILAR ARTICLES

Joseph N. Kuzmick, Clifton, N. J., assignor to Raybestos-Manhattan, Inc., Passaic, N. J., a corporation of New Jersey No Drawing. Application July 2, 1940, Serial No. 343,551

6 Claims. (Cl. 260—9)

This invention relates to the manufacture of molded composition brake linings and similar friction or tractive-surface bodies such as clutch facings, brake blocks and the like.

Brake linings and similar friction or tractive articles have been made by three general type methods: (1) The covering or impregnating of asbestos cloth or fabric with a suitable binder, (2) the felting together of asbestos fibres and impregnating the felted mass with the proper type of binder, and (3) The mixing of a binder with asbestos fibres with or without fillers and cold molding with subsequent baking or molding with heat and pressure to the desired shape. In all of these methods the binders used are of the type that react with heat to give the article a permanent shape or form and also contribute to the final serviceability of the product.

My invention relates to the manufacture of brake linings and similar tractive-surface bodies according to the third type of method, and more particularly to such manufacture wherein potentially reactive synthetic resins are employed as the binder. Where a liquid potentially reactive synthetic resin is used as a binder, it is difficult to secure an intimate uniform mixture because the liquid resins in general are relatively quite viscous and the volume or amount of the resin used is small compared to the mass of fluffy asbestos fibres to be coated. Where a solvent is used to increase the volume and decrease the viscosity of the resin binder, then an additional operation is required to remove the solvent, and this operation, together with the cost of the solvent, is expensive. Where dry potentially reactive synthetic resins are employed, it is difficult to secure an intimate mixture and to uniformly wet the asbestos fibres with the binding resin. The method employing the dry synthetic resins is very important commercially, however, because of the manufacturing economies obtained therewith which are the result of the use of very simple and inexpensive mixing and molding equipment and of the elimination or absence of solvents. A major disadvantage, however, in the commercial practice thereof is the incomplete wetting and coating of the asbestos fibres with the binder, resulting in moisture absorption by said coated fibres, which in turn produces erratic braking characteristics of the tractive-surface body. Other objections are due to the limitations of the binder itself.

In my Patent No. 2,025,951, granted December 31, 1935, I disclose the use of certain dry fluxes or plasticizers, which, when added to the relatively dry mix of asbestos fibres and synthetic resin binder, functions when the mass or mix is subjected to the indurating heat, to cause the resin binder to flow more readily and uniformly throughout the mass, thereby wetting the asbestos fibres much better and resulting in the obtaining of a very uniform, dense piece of friction or tractive material, having great strength, a high degree of resistance to wear, and very uniform service performance characteristics. I have now discovered that the addition to the mix of asbestos fibres and synthetic resin binder of certain esters of sugar are of great benefit when utilized in this manufacturing method in lieu of the dry flux or plasticizer disclosed in said patent. More particularly, I have found that when an ester of sugar and more particularly a saccharose acetate such as sucrose octa-acetate is incorporated in these dry mixes, the ester of sugar induces, under the influence of the indurating heat or of the molding heat and pressure, extreme liquifaction of the dry pulverized synthetic resin bond to such a degree that the fibre lengths of asbestos in the resulting mass are thoroughly and uniformly coated with the resin bond to an extent which has heretofore been possible only through the use of liquid binders, which in themselves are not as suitable for friction material purposes. I have empirically determined that the degree and uniformity of coating of the asbestos fibres in the mass by and with the synthetic resin bond is such that the fibres are substantially completely resin wetted or coated so that the disadvantage of partially wetted fibres with consequent liability to water or moisture absorption is entirely obviated.

The use of an ester of sugar and particularly a saccharose acetate such as sucrose octo-acetate results in other noteworthy advantages. Inasmuch as sucrose octa-acetate has a melting point of approximately 80° C., it can be introduced in a pulverulent state as a distinct component of the mix, and upon fusion, it possesses the very desirable feature of forming a glass like bond by itself which is retained upon cooling and does not recrystallize as is the case with ordinary plasticizers and modifiers. Furthermore, the diffusion with the synthetic resin is such that apparently complete solution is effected, precluding the subsequent bleeding out of any of the organic constituents at elevated temperatures in service. Obviously this is an important advantage, as the bleeding out even in small amounts of the fluxes and plasticizers used heretofore adversely affects the frictional properties of the friction body. It is clear, therefore, that an acetate saccharose such as sucrose octa-acetate acts in these respects differently than a plasticizer when used in conjunction with a synthetic resin bond in a friction body, inasmuch as it exhibits distinct bonding characteristics even when used alone and forms a bond with the synthetic resins. This compatability of the two binders is such that in effect the resulting combined bond possesses the novel feature of a marked increase in modulus of elasticity at elevated temperatures. This increase in modulus of elasticity at elevated temperatures is reflected in the performance of such a friction body by the absence of the usual decrease in coefficient of friction from sustained or energetic deceleration.

The advantages accruing from the manufacturing method and the composition of the present invention, therefore, are (1) the ability to employ a method effectively wherein all the components in the moldable mix are in a relatively dry state, (2) the use of such a method wherein the asbestos fibres are thoroughly and uniformly coated with the resin bond to an extent where liability to moisture absorption by the fibres is eliminated and the resulting erratic braking thereby obviated, (3) the making of tractive-surface bodies which possess a uniform coefficient of friction under varied conditions of service, and (4) the making of such tractive-surface bodies which possess to a substantial degree increased durability charactistics.

As an example of the manufacture of molded compositions according to the present invention, I mix thoroughly in a tumbling barrel or two-arm mixer, 60 parts by weight of asbestos fibre, 20 parts by weight of pulverized potentially reactive synthetic resin such as a phenol-formaldehyde resin, and 10 parts by weight of a saccharose acetate such as sucrose octa-acetate. These constituents after being thoroughly mixed are then charged into a mold and indurated to resin infusibility under heat and pressure. When the resin is reacted to the infusible state, then the product is ground or buffed to size and the product is ready for use.

For the synthetic resin, I prefer to use a phenol-formaldehyde or a phenol-furfural synthetic resin, preferably in the dry pulverized state. However, other resins may be used and I do not limit myself to the use of solid pulverized resins even though these are preferred, since I find similar beneficial effects with the use of liquid synthetic resins and also those modified with siccative oils.

While I have given above a preferred example, it will be apparent that many variations may be made in the ingredients used and in the relative proportions thereof. I have found that the proportion of the saccharose acetate and particularly sucrose octa-acetate may be varied from 10 to 50 per cent on the weight of the resin binder, with substantial effectiveness. The proportion of the resinous binder may also be varied. A part of the asbestos fibres may be replaced by fillers such as barytes, talc, oxides, sulphur or graphite, and the product may be further modified by the addition of materials such as comminuted rubber or the reaction products of anacardic acid, the selection of these fillers or materials depending upon the type and frictional coefficient of the tractive article desired. Although sucrose octa acetate is preferred as the ester of sugar because it is most economical and effective, other esters of sugar may be used, and I have found, for example, that glucose or fructose penta-acetate may be employed with effectiveness. Other modifications may be made without departing from the essence of the invention as defined in the following claims.

I claim:

1. The process of making molded composition friction or tractive-surface bodies, which consists in mixing asbestos fibres, a heat-convertible potentially reactive synthetic resin, and an ester of sugar to produce a relatively dry mass or mix, and in then molding the said mass or mix and heat-hardening the same to produce a molded body of friction material.

2. The process of making molded composition friction or tractive-surface bodies, which consists in mixing asbestos fibres, a heat-convertible potentially reactive synthetic resin, and a saccharose acetate to produce a relatively dry mass or mix, and in then molding the said mass or mix and heat-hardening the same to produce a molded body of friction material.

3. The process of making molded composition friction or tractive-surface bodies, which consists in mixing asbestos fibres, a heat-convertible potentially reactive synthetic resin, and sucrose octa-acetate to produce a relatively dry mass or mix, and in then reacting the mass or mix under heat and pressure to the infusible state to produce a molded body of friction material.

4. A molded and heat-hardened composition of friction material, comprising asbestos fibres coated with and bonded by a heat-convertible potentially reactive synthetic resin and an ester of sugar.

5. A molded and heat-hardened composition of friction material, comprising asbestos fibres coated with and bonded by a heat-convertible potentially reactive synthetic resin and a saccharose acetate.

6. A molded and heat-hardened composition of friction material, comprising asbestos fibres coated with and bonded by a heat-convertible potentially reactive synthetic resin and sucrose octa-acetate.

JOSEPH N. KUZMICK.